United States Patent
Wickland

(12) 
(10) Patent No.: US 6,355,078 B1
(45) Date of Patent: Mar. 12, 2002

(54) ARRANGEMENT FOR VENTING AN ENCLOSURE

(75) Inventor: Terry J. Wickland, Golden, CO (US)

(73) Assignee: Nuclear Filter Technology, Inc., Golden, CO (US)

( * ) Notice: Subject to any disclaimer, the term of this patent is extended or adjusted under 35 U.S.C. 154(b) by 0 days.

(21) Appl. No.: 09/577,500

(22) Filed: May 24, 2000

(51) Int. Cl.$^7$ ............................................. B01D 46/00
(52) U.S. Cl. ..................... 55/385.4; 55/364; 55/376; 55/486; 55/DIG. 39
(58) Field of Search .......................... 55/385.1, 385.4, 55/DIG. 39, 364, 376, 486, 502, 505; 95/45, 55; 96/4, 5, 6, 15, 16

(56) References Cited

U.S. PATENT DOCUMENTS

| | | | |
|---|---|---|---|
| 4,449,970 A | * | 5/1984 | Beuan et al. ............... 55/385.4 |
| 4,668,258 A | * | 5/1987 | Steer ......................... 55/385.4 |
| 5,108,474 A | * | 4/1992 | Riedy et al. ................ 55/385.4 |
| 5,370,638 A | * | 12/1994 | Keyes ........................ 55/385.4 |
| 5,372,594 A | * | 12/1994 | Colacello et al. .......... 55/385.4 |
| 5,720,789 A | * | 2/1998 | Pinson ....................... 55/385.4 |
| 5,725,645 A | * | 3/1998 | Wickland et al. .......... 55/385.4 |
| 5,733,271 A | * | 3/1998 | Bjorn ......................... 55/385.4 |
| 5,885,453 A | * | 3/1999 | Chatelin et al. ........... 55/385.4 |
| 5,891,223 A | * | 4/1999 | Shaw et al. ................ 55/385.4 |
| 5,914,415 A | * | 6/1999 | Tago .......................... 55/385.4 |

* cited by examiner

Primary Examiner—Minh-Chau T. Pham
(74) Attorney, Agent, or Firm—Millen, White, Zelano & Branigan, P.C.

(57) ABSTRACT

A bag for containing nuclear waste material has a venting arrangement having of a plurality of vent holes through the wall of the bag. Each vent hole includes a filter arrangement in which there is a first film mounted on the inside of the bag in alignment with the vent hole and a second film mounted on the outside of the bag aligned with both the vent hole and the first film to define a chamber between the first and second films, the chamber including the vent hole. A HEPA filter media is disposed in the chamber, so that fluid in the chamber passing through apertures in the first and second films also passes through the filter media. A preferred use of the present invention is to vent explosive gasses, such as hydrogen, from bags containing waste material such as nuclear waste material.

5 Claims, 1 Drawing Sheet

ARRANGEMENT FOR VENTING AN ENCLOSURE

FIELD OF THE INVENTION

The present invention is directed to an arrangement for venting an enclosure. More particularly, the present invention is directed to an arrangement for venting an enclosure wherein the enclosure is a bag containing toxic waste material.

BACKGROUND OF THE INVENTION

The storage of waste materials, more particularly nuclear waste materials, is a vexing problem because the materials must be stored for a very long time. For example, nuclear waste must be stored for thousands of years. Temporary storage sites for nuclear waste are being filled at a rapid rate so nuclear waste materials must be transported to permanent and semi-permanent sites for disposal. Even at semi-permanent or permanent sites, there is concern that these materials may enter either the atmosphere or ground water so they must be stored in containers which minimize and hopefully eliminate leakage and the danger of the containers rupturing.

It is necessary to transport nuclear waste materials from nuclear waste producing sites to semi-permanent and permanent storage sites. It is desirable that containers having materials which might generate non-toxic, explosive gasses, such as hydrogen, be ventilated during transport. Accordingly, there is a need for an effective, inexpensive ventilation arrangement for these containers.

When storing and transporting plutonium waste, more plutonium waste can be stored safely in ventilated containers than unventilated containers. By utilizing ventilated containers, five to ten times more plutonium waste can be stored in a single container than can be stored if the containers are not ventilated. Accordingly, effectively ventilating containers so that explosive gasses can escape without also releasing radioactive material from the containers results in considerable cost savings.

In prior art arrangements, bags which are used as containers have utilized relatively rigid or stiff structures in order to hold filters in alignment with vent holes through the bags. Since these filters are stiff, they present discontinuities in a bag's surface, which can generate localized stresses and which can interfere with sliding a bag into an outer rigid container. In view of these and other difficulties, there is a need to improve venting arrangements for containers that store waste material, especially nuclear waste material.

SUMMARY OF THE INVENTION

In view of the aforementioned considerations, the present invention is directed to an arrangement for venting an enclosure containing a material having an effluent associated therewith, wherein the container has a wall with an inside surface and an outside surface and has a vent hole through the surfaces. In accordance with the invention, a first film is adhered to the inside surface of the closure over the vent hole, the first film having a first aperture therethrough. A second of film is adhered to the outside surface of the enclosure over the vent hole, the second film having a second aperture therethrough and cooperating with the first film to define a chamber therebetween. A filter media is disposed in the chamber between the films, to filter particles and liquid from the effluent as the effluent passes therethrough, i.e., after the effluent enters the first aperture and before the effluent exits through the second aperture.

In a further aspect of the invention, the filter media, vent hole and apertures are aligned.

In still another aspect of the invention, the filter media is a resin material with a permanent electrical charge.

In a preferred embodiment of the invention, the filter media is comprised of split polypropylene fibers with a permanent electrical charge thereon.

In still a further embodiment of the invention, the enclosure is a bag made of a material such as polypropylene, polyurethane or polyvinylchloride.

In a further aspect of the invention, the bag and strips of film are made of polyurethane and the adhesive is an acrylic adhesive.

In a further aspect of the invention, the bag as previously described is placed in a rigid container, the rigid container preferably being made of stainless steel if the waste material is nuclear waste material.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
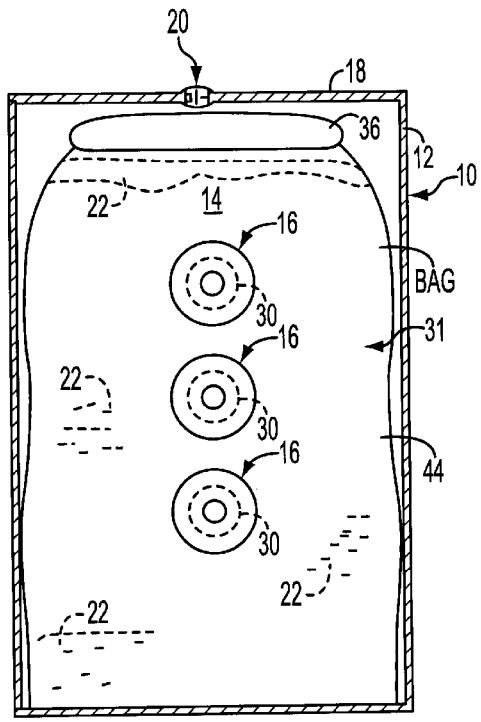
FIG. 1 is a view of a waste storage arrangement in accordance with the present invention wherein a vented bag is disposed within a container.

FIG. 1 discloses a waste storage arrangement 10 in accordance with the present invention wherein the arrangement comprises a rigid container 12, in which is disposed a bag 14 made of resinous material, the bag having a plurality of venting arrangements 16 through the side wall thereof. In an exemplary embodiment of the invention, the rigid container 12 is a stainless steel container in the form of a drum which has a lid 18. The lid 18 may or may not include a vent 20. Stainless steel drums are preferably used to store nuclear waste 22 such as plutonium nuclear waste. When the waste 22 being stored is plutonium nuclear waste (usually in the form of plutonium salts) five to ten times as much nuclear waste can be retained safely in a vented waste container 12 than in an unvented container.

Figure 2:
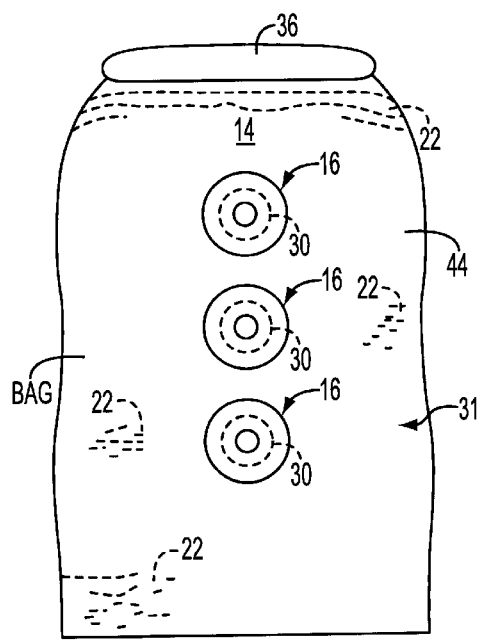
FIG. 2 is a side view of the bag showing a series of venting arrangements.

Referring now to FIG. 2, in which the bag 14 is shown in isolation, the venting arrangements 16 are made by initially laying the bag 14 flat and drill punching a plurality of vent holes 30 through the wall 31 of the bag. Opposite the vent holes 30 shown in FIG. 2, there are additional vent holes on the other side of the bag 14 since the drill punch goes completely through the bag 14. In an example of the invention used for storing plutonium waste 22, the bag 14 is preferably at least 48" high, and has a plurality of the vent holes 30 drilled therein. For example, the holes are located from the bottom at intervals of 6", 18", 24", 30", 36" and 42". The bag 14 has an o-ring connection 36 at the top for connecting with a glove box (not shown) so that nuclear waste material 24 is transferred to the bag 14 without release to the atmosphere. The o-ring top 36 is then closed and sealed so that the only communication that the interior of the bag 10 has with the surrounding environment is through the venting arrangements 16.

Figure 3:
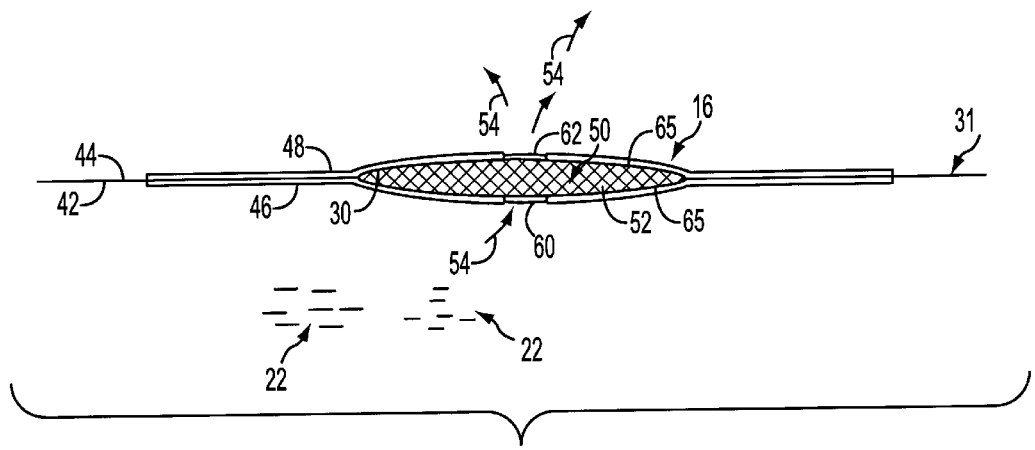
FIG. 3 is a side elevation taken through one of the venting arrangements of FIG. 2.

Referring now to FIG. 3, in conjunction with FIG. 2, it is seen that the wall 40 of that bag 14 has an inside surface 42 and an outside surface 44 wherein the inside surface faces the nuclear waste 22 within the bag. A first of film 46 is adhered to the inside surface 42 of the bag wall 40 so as to overlie the vent hole 30 while a second film 48 is adhered to the outside surface 44 of the wall and also overlies the vent hole 30. The first and second films 46 and 48 cooperate to define a chamber 50 therebetween, which chamber includes the hole 30. Mounted within the chamber 50 is a wafer filter media 52. In order for effluent 54 for the nuclear waste 24 to pass through the bag wall 40, the first film 46 has an aperture 60 therein which has a diameter substantially less than the diameter of the vent hole 30 and the second film 48 has an aperture 62 which also has a diameter less than the vent hole 30. Preferably, the first and second films 46 and 48 have a layer of adhesive 65 thereon so that the wafer 52 of filter media is securely adhered in place between the first and second films.

In accordance with one embodiment of the venting arrangement 16, the bag 40 is made of a resinous material which may, for example, be polyurethane, polyethylene or polyvinylchloride. The first and second strips of film material may be made of the same resin, however, transparent polyurethane is preferable because it may be bonded to the inside and outside surfaces 42 and 44 of the bag 10 with pressure-sensitive, permanent, acrylic adhesive applied in the layer 65 thereon which also aggressively retains the filter media 52 thereto. This is especially the case if the filter media is made of a material such as polypropylene fibers.

Considering the filter media 52 now more specifically, a preferred filter media is a filter media known as Nucfil-034 DA sold under the trademark FILTRETE® by the 3M Company. This filter media is an HEPA filter media which is thin and flexible and provides an HEPA filtered bag-out-bag that allows bag-outs that easily insert into steel containers such as the container 12 of FIG. 1. In the embodiment under consideration, the diameter of the filter media is 1.2 inches ±0.2 inches and the thickness of the filter media is about 0.2 inches in its natural state. The mass of material is about 0.29 grams and the material is described as a proprietary split polypropylene fiber material with a permanent electric charge.

The bag materials are preferably about 8 to about 14 mill polyvinylchloride, about 3 to about 14 mill polyethylene and about 5 to about 14 mill polyurethane, each with vent holes 30 having a diameter of about 1.2 inches.

A preferable film material for the strips 46 and 48 is transparent polyurethane number 8125 having a thickness of 0.008 inch. The preferable adhesive is pressure-sensitive, permanent, acrylic adhesive. Each film is in the form of a circular patch having a nominal outside diameter of about 4.0 inches with the apertures 60 and 62 having a nominal diameter of about 0.33 inches.

In assembling the venting arrangements 16 on the bag 14, the bag is turned inside out after the vent holes 30 have been drilled therethrough and the second films 48 have been adhered to the outside surface 44 of the bag. The filter media wafers 52 comprising split polypropylene fibers with a permanent electric charge, i.e., Nucfil-034 DA are then affixed against the inside surface of the second films 48 in alignment with the vent holes 30 and the first films 46 are placed over the filter media wafers 52 and adhered against the inside surface 42 of the bag. The bag 10 is then turned right side out.

Each of the filter assemblies 16 utilizing the Nucfil-034 DA filter medias are tested using the filter efficiency test, P.S. 6.0. Each filter assembly 16 has a minimum air flow capacity of 300 ml/min at less than 0.5 inches W.C. Pressure Differential. The minimum filter efficiency using poly dispersed 0.3 to 0.5 micron DOP (dioctylpthalate) is 99.97% removal efficiency. The overall filter configuration qualifies for hydrogen permeability using P.S. 26.0 Rev 002. Each filter media wafer 52 has a hydrogen permeability sufficient to ensure that the media allows greater than 10.7 E-06 mole/second/mole fraction diffusion through each filter assembly 16. According, the bag 14 vents with a very low pressure differential.

While this invention has a specific application in that it is used for storage of nuclear waste material in bags 14 contained in rigid stainless steel containers 12, this invention has applications to any other storage arrangement or container in which a bag is vented or in which an enclosure other than a bag is vented.

Without further elaboration, it is believed that one skilled in the art can, using the preceding description, utilize the present invention to its fillest extent. The above preferred specific embodiments are, therefore, to be construed as merely illustrative, and not limitative of the disclosure in any way whatsoever.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A bag useful for containing hazardous waste material having an explosive effluent gas associated therewith, the enclosure having a wall with an inside surface and an outside surface and at least one vent hole through the surfaces, the bag comprising:

a wall made of elastic resin material selected from the group consisting of polyvinylchloride, polyethylene and polyurethane;

a first polyurethane film adhered with an acrylic adhesive to the inside surface of the bag over the vent hole, the first polyurethane film having a first aperture therethrough;

a second polyurethane film adhered with an acrylic adhesive to the outside surface of the enclosure over the vent hole, the second polyurethane film having a second aperture therethrough aligned with the first aperture and cooperating with the first polyurethane film to define a chamber therebetween, and a filter media of split polypropylene fibers with a permanent electric charge disposed in the chamber to filter particles and liquid from effluent as the effluent passes therethrough after the effluent enters the first aperture in the first polyurethane film and before the effluent exits through the second aperture in the second polyurethane film.

2. The bag claim 1, wherein the bag has a plurality of vent holes with each vent hole having the filter media retained there at by the first and second film materials.

3. The bag claim 2, wherein the bag is in combination with the hazardous nuclear waste material and with a rigid container that receives the bag therein.

4. The bag of claim 3, wherein the rigid container is made of steel.

5. The bag of claim 1 wherein each filter assembly has a minimum airflow capacity of 300 ml/mm at less than 0.5 inch water column, a 99.97% removal efficiency using 0.3 to 0.5 micron dioclylphalate and a hydrogen permeably allowing at least 10.7E-06 mole/second/mole fraction diffusion.

* * * * *